United States Patent [19]

Stasell

[11] Patent Number: 5,184,301

[45] Date of Patent: Feb. 2, 1993

[54] AUTOMOTIVE VEHICLE MICROPROCESSOR CONTROL HAVING CLUTCH PRIORITY ENGINE SPEED CONTROL

[75] Inventor: Mark W. Stasell, Fort Wayne, Ind.

[73] Assignee: Navistar International Transportation Corp., Chicago, Ill.

[21] Appl. No.: 618,755

[22] Filed: Nov. 27, 1990

[51] Int. Cl.⁵ ............................................. B60K 41/02
[52] U.S. Cl. ............................ 364/431.07; 364/424.1; 192/0.084; 192/0.096
[58] Field of Search ............ 364/431.07, 431.1, 424.1, 364/426.04, 431.01; 192/0.084, 0.096; 123/357

[56] References Cited

U.S. PATENT DOCUMENTS

| | | | |
|---|---|---|---|
| 4,194,608 | 3/1980 | Usui et al. ................... | 192/0.084 X |
| 4,493,303 | 1/1985 | Thompson et al. ............. | 123/357 |
| 4,714,144 | 12/1987 | Speranza ...................... | 192/0.084 |
| 4,817,776 | 4/1989 | Tateno et al. ................ | 192/0.084 X |
| 4,896,267 | 1/1990 | Frantz et al. ................ | 364/431.07 X |
| 4,912,642 | 3/1990 | Larsen et al. ................ | 364/431.01 |
| 4,914,597 | 4/1990 | Moncelle et al. ............. | 364/426.04 |
| 5,019,986 | 5/1991 | Londt et al. ................. | 364/426.04 |

*Primary Examiner*—Parshotam S. Lall
*Assistant Examiner*—Collin W. Park
*Attorney, Agent, or Firm*—Dennis K. Sullivan

[57] ABSTRACT

A microprocessor engine control for an internal combustion engine powered truck is provided with a clutch priority engine speed control by the inclusion of a clutch pedal switch for sensing incipient clutch engagement at vehicle launch. The microprocessor executes an algorithm that takes control of engine speed away from the driver until the launch is successfully completed. The algorithm causes the engine to operate at a speed that has been predetermined to minimize wear and tear on the powertrain. The algorithm includes a false start feature that resets the alogrithm in the event of an aborted launch.

2 Claims, 2 Drawing Sheets

AUTOMOTIVE VEHICLE MICROPROCESSOR CONTROL HAVING CLUTCH PRIORITY ENGINE SPEED CONTROL

FIELD OF THE INVENTION

This invention relates generally to automotive vehicles that are powered by internal combustion engines, such as highway tractors and heavy trucks for example. More specifically, it relates to microprocessor-based engine controls for such vehicles.

BACKGROUND OF THE INVENTION

Microprocessor-based controls are used with automotive vehicle engines to perform various functions. One of the functions that has heretofore been proposed for such controls is programmed starting. Programmed starting comprises an algorithm that is executed by the microprocessor when the driver starts the engine, principally to prevent the driver from operating the engine throttle in a way that might adversely affect the starting process. The control is configured to conduct the engine starting procedure in a predetermined manner defined by the algorithm so that the starting procedure is unaffected by the driver's actions during that time. Basically, the control preempts the driver's actions. Once the starting procedure has been successfully completed, full control of the throttle reverts to the driver.

Another function that has heretofore been proposed for microprocessor-based engine controls is programmed vehicle launching. As applied to an automotive vehicle which has a manual transmission, programmed vehicle launching comprises placing both the clutch function and the throttle function under the control of the microprocessor during launch. The microprocessor executes an algorithm that has been predetermined to produce a satisfactory launch.

The incorporation of a programmed launch function in a vehicle comprises not only the development of an algorithm for automating both throttle operation and clutch operation, but also suitable clutch and throttle actuators for performing respective clutch and throttle operations to the exclusion of the clutch and accelerator pedals that are used by the driver. For this reason, the system must of necessity be somewhat complex, and complexity invariably adds to the cost. Moreover, it is a difficult task to write an algorithm that will operate a clutch and throttle satisfactorily for the many different types of launch situations that a driver may encounter. Yet the manner in which a clutch and throttle are operated during launch has a very significant influence on clutch life and performance.

The problem of accelerated clutch wear and tear is typified by the experiences of fleet operators. Different drivers may launch a truck in different ways. Some may be especially careful in conducting a launch; others, less so. One significant cause of accelerated clutch wear and tear is repeated clutch engagements at too high an engine speed. The particular type of clutch may also be a factor in determining the best engine speed for launch.

Because improper clutching can accelerate wear and tear on the clutch, and other powertrain components too, it continues to be a desirable objective to have some sort of algorithm-controlled launch.

SUMMARY OF THE INVENTION

The present invention relates to a new and improved means for vehicle launch which offers certain advantages over a programmed launch as described above.

The present invention comprises means for launching a vehicle such that engine speed is regulated in a particular way during the launch, while complexities associated with the incorporation of an algorithm that controls the clutch engagement are avoided. In a preferred embodiment, the invention is embodied by the use of a switch that is disposed to identify the incipient release of the clutch pedal by the driver, i.e. identify incipient clutch engagement at launch. The switch signals the microprocessor to execute the launch algorithm. The microprocessor pre-empts the throttle position signal that is received from the throttle position sensor associated with the driver's accelerator pedal and causes the throttle to operate to a setting that has been pre-programmed into the microprocessor's memory to produce an engine speed that has previously been deemed suitable for minimizing wear and tear on the clutch during launch. During launch the throttle is set irrespective of the extent to which the driver is depressing the accelerator pedal. Thus, the clutch release takes place with the engine operating at a controlled speed established by the algorithm, and not at whatever speed would otherwise be established by the position of the accelerator pedal.

The completion of a successful launch is indicated by the transmission input shaft having been accelerated to a predetermined speed that is correlated with engine speed, and at the time of such an indication the microprocessor relinquishes control of the throttle to the driver. Although the driver has no control over the engine speed during launch, he or she does have control over the clutch, and in this respect has some limited control over the launch. The invention affords this limited control to the driver because it is believed that the driver can do a better job of engaging the clutch than can an algorithm operating the clutch through an actuator. Thus the invention provides a certain degree of driver control over the launch, but with a much reduced likelihood of driver-induced accelerated wear and tear on the clutch. A feature of the algorithm is a false start detection which resets the algorithm in the event that the clutch is disengaged before a launch has been successfully completed.

BRIEF DESCRIPTION OF THE DRAWINGS

Further features, advantages, and benefits of the invention, along with those already enumerated, will be seen in the ensuing description which is accompanied by drawings. The drawings disclose a presently preferred embodiment of the invention according to the best mode contemplated at the present time in carrying out the invention. In the drawings.

DESCRIPTION OF THE PREFERRED EMBODIMENT

Figure 1:
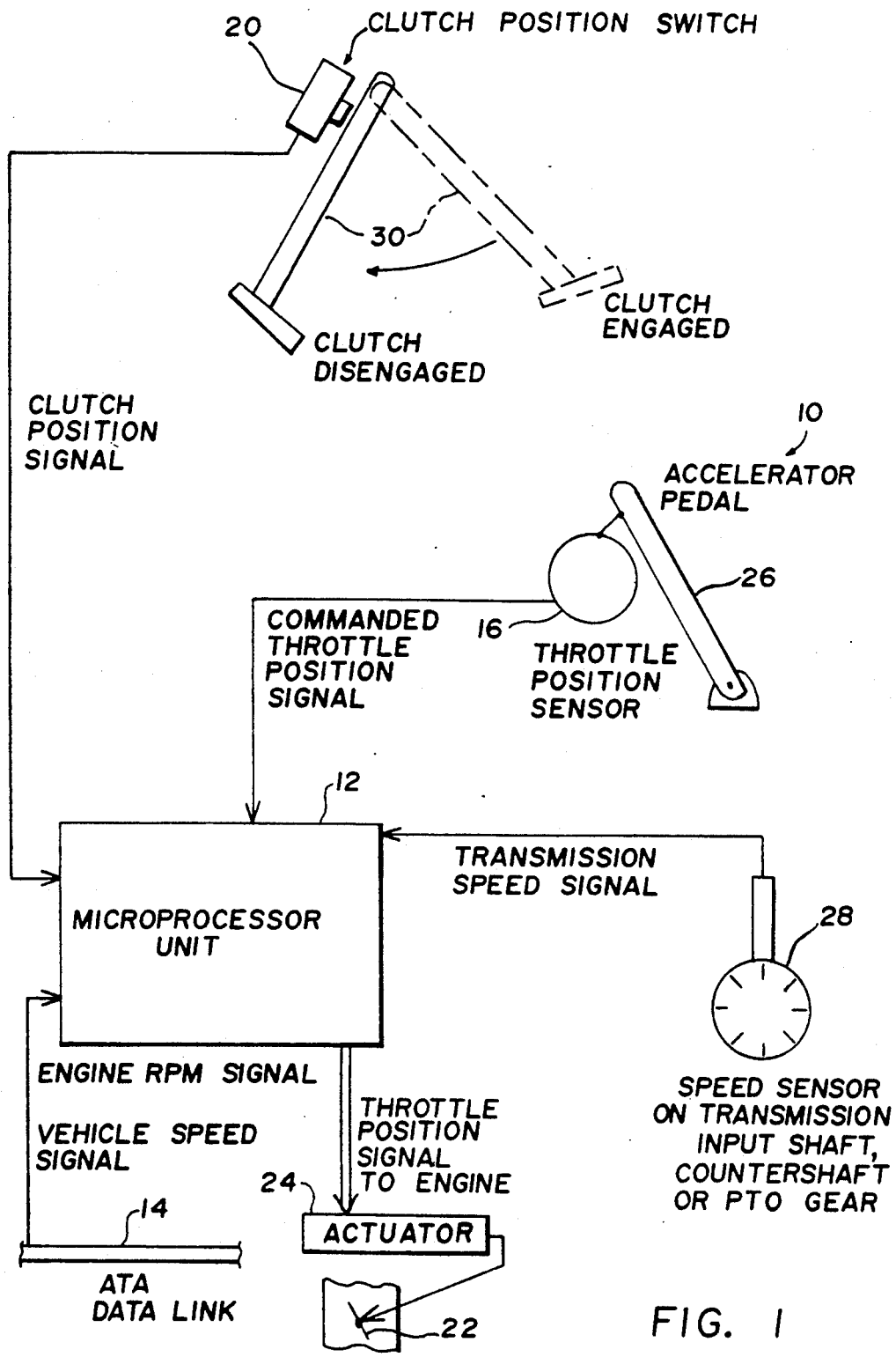
FIG. 1 is a block diagram illustrating a microprocessor based engine control system comprising the clutch priority engine speed control of the present invention.

FIG. 1 shows a vehicle engine control system 10 which comprises: a microprocessor unit 12; an ATA data link 14; a throttle position sensor 16; a transmission input shaft speed sensor 28; and a clutch position switch 20. Microprocessor unit 12 controls various functions, including the setting of an engine throttle 22 by means of an actuator 24.

ATA data link 14 is part of a conventional on-board communication system, associated with microprocessor unit 12, that provides certain data in electronic format for use by devices, including microprocessor unit 12, that are on the data link. The microprocessor unit is also conventional hardware. A typical system already provides engine speed information and vehicle road speed information on the data link for use by the microprocessor unit, and these two information inputs are also utilized by the microprocessor unit in putting the present invention into practice. Engine speed and vehicle road speed are typically derived from respective sensors, such as a crankshaft pick-up and a wheel speed pick-up.

Sensor 16 is a conventional electromechanical transducer that is placed in association with a conventional accelerator pedal 26 by which the driver of the vehicle operates throttle 22. Sensor 16 has an input that is linked to pedal 26 and an output that is electrically coupled with microprocessor unit 12. The sensor operates to deliver to the microprocessor unit an electrical input that represents a throttle position (throttle setting) that is desired by the driver. The microprocessor unit acts upon the command from sensor 16 to cause actuator 24 to position the throttle blade(s) in a manner that tracks the positioning of pedal 26 by the driver. This form of throttle operation is conventional technology in a modern electronically controlled diesel engine.

Practice of the present invention also requires certain information about the speed of the vehicle's transmission and about the position of the clutch that couples the engine output shaft with the transmission input shaft.

In a heavy truck the transmission is typically a manually shifted, multi-gear type. The speed that is of interest in the transmission is the transmission input shaft speed. Sensor 28 is disposed in association with the transmission and is electrically coupled with microprocessor unit 12 to provide to the microprocessor unit an electrical signal representing transmission input shaft speed. Since the transmission contains several moving parts that rotate in synchronism with the transmission input shaft, the manner in which sensor 28 is associated with the transmission allows for its association either directly with the transmission input shaft or alternatively with any other moving part that rotates in synchronism with the transmission input shaft.

Switch 20 serves to sense clutch position. Since there is typically a direct mechanical linkage between the clutch and a clutch pedal 30 via which the driver of the vehicle operates the clutch, switch 20 can be placed in association with either the clutch, the clutch pedal, or the linkage in a manner that properly correlates switch operation with the clutch operation in the manner contemplated by the inventive principles herein described. One especially convenient placement for switch 20 is in association with clutch pedal 30. When the driver has depressed the clutch pedal sufficiently to fully disengage the clutch (solid-line position of FIG. 1), switch 20 is actuated. As the clutch pedal is being released (motion toward the broken-line position of FIG. 1), a point is reached where the clutch pedal ceases to actuate switch 20. This point is preferably just slightly before or at the point of incipient clutch engagement.

Figure 2:
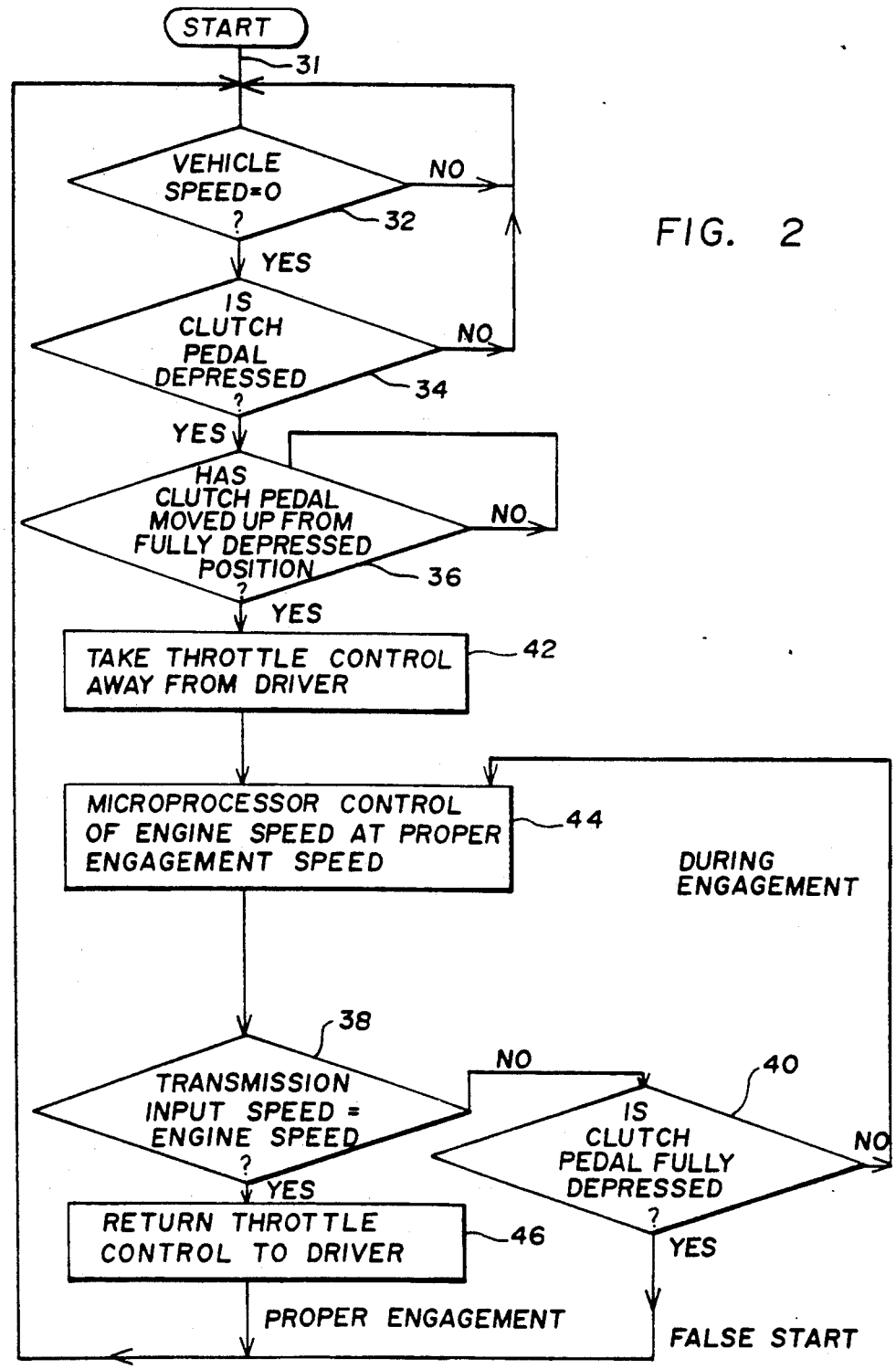
FIG. 2 is a flow diagram for the algorithm that is used to accomplish clutch priority engine speed control.

Having described the hardware that is present in the engine control system, attention can now be directed to the operation of microprocessor unit 12. FIG. 2 portrays a flow diagram that illustrates the details of the clutch priority engine speed control aspect of the invention. The flow diagram represents a presently preferred algorithm for the performance of this function. Actual programming of the microprocessor to implement the algorithm is conducted in accordance with conventional techniques.

The illustrated algorithm comprises a start 31; decision points (decision blocks) 32, 34, 36, 38, and 40; and command points (command blocks) 42, 44, and 46. Each time that microprocessor unit 12 calls the algorithm, decision block 32 is executed to check vehicle road speed. Vehicle speed found to be non-zero indicates that the vehicle is in motion and therefore not in a condition awaiting launch. Hence if the decision block 32 finds that the vehicle speed is not zero, further execution of the algorithm is terminated and the algorithm is reset to await its next call by the microprocessor. On the other hand if decision block 32 finds that the vehicle speed is zero, then the vehicle is possibly in a condition for launch, and the algorithm proceeds to decision block 34.

This step involves interrogation of switch 20. If the switch is not actuated, it means that the clutch pedal is not fully depressed, and hence that the clutch is in a condition other than one of full disengagement. In such a case, further execution of the algorithm terminates and the algorithm is reset to await its next call by the microprocessor. On the other hand if decision block 34 finds switch 20 actuated, meaning that the clutch pedal is fully depressed, then the vehicle is definitely in a condition for launch, and the algorithm proceeds to the next decision block 36.

Decision block 36 looks for a change in the condition of switch 20 from actuated to non-actuated. Such a change will occur as the driver releases the clutch pedal, the switch becoming non-actuated just slightly before, or at, the incipiency of clutch engagement.

At launch the driver will typically depress accelerator pedal 26 for the purpose of accelerating the engine. The speed to which the engine will be accelerated for launch is essentially dependent upon the driver. Some drivers will exercise care in operating the throttle during launch; others may not be so careful. Principles of the invention come into play to eliminate this variable.

Once decision block 36 has determined that clutch engagement is incipient, the microprocessor assumes full control of throttle 22, to the exclusion of the signal from sensor 26. The memory of microprocessor unit 12 has been previously programmed with an engine speed that has been deemed suitable for launching the vehicle without unduly accelerating wear and tear on the clutch. It is this pre-programmed engine speed that is now utilized by the microprocessor to set the throttle. The microprocessor operates to effect closed-loop control over the throttle setting by utilizing engine speed feedback from data link 14. As a consequence, the engine is caused to assume the pre-programmed engine launch speed as the clutch is being engaged. These functions are commanded by the blocks 42 and 44 in FIG. 2.

Successful clutch engagement is ascertained by decision block 38. The microprocessor looks at transmission input shaft speed in relation to engine speed, and when the attainment of a predetermined relationship is detected, equality in the illustrated embodiment, a successful completion of the launch is indicated whereupon the microprocessor relinquishes control of the throttle to sensor 16. Thus, execution of the algorithm is now complete.

The algorithm also includes a false start feature. While the throttle setting is being controlled by the microprocessor, the condition of switch 20 is being monitored. This step in the algorithm is depicted by block 40. So long as the transmission has not been accelerated to a speed indicating a successful launch, decision block 38 will so indicate by causing the microprocessor unit to repeatedly look at clutch switch 20. The continued non-actuation of the switch indicates that the launch is still in progress. However, switch actuation prior to successful completion of the launch is an indication that for some reason the clutch has been disengaged. This serves to indicate that the launch has been aborted, i.e. a false start. Such an abort terminates the execution of the algorithm and resets the algorithm to await its next call by the microprocessor.

Based on the foregoing description, the reader can therefore appreciate that the clutch priority engine speed control feature provides an effective means to aid in minimizing accelerated wear and tear on the powertrain, particularly on the clutch.

An automotive vehicle microprocessor control having clutch priority engine speed control has been described. While the details of the disclosure relate to a presently preferred embodiment, principles of the invention may be practiced in other embodiments that are equivalent to the following claims.

What is claimed is:

1. In an automotive vehicle having a powertrain which comprises an internal combustion engine, a clutch, a manual transmission, and road-engaging wheels, said engine comprising a throttle and an output shaft, said clutch serving to couple said engine output shaft with said transmission input shaft, said powertrain comprising means coupling said transmission output shaft with at least some of said wheels, said vehicle comprising controls that are selectively operable by a driver of the vehicle comprising a clutch control comprising a clutch pedal disposed for operation by the driver for selectively engaging and disengaging the clutch and a throttle control comprising an accelerator pedal disposed for operation by the driver for selectively setting the throttle, said vehicle further comprising a microprocessor that is operatively coupled with said powertrain such that said microprocessor can act on information comprising throttle setting, vehicle road speed, engine output shaft speed, and transmission input shaft speed, and can distinguish between clutch engagement and disengagement, the improvement which comprises means, effective upon an attempt to launch the vehicle from standstill by the driver's operating the clutch control via said clutch pedal to cause the clutch to operate from disengagement toward engagement and also operating the throttle control via said accelerator pedal, to cause the throttle to occupy a setting that causes the engine output shaft to rotate at a certain speed programmed into the microprocessor and desired for minimizing powertrain wear and tear in consequence of clutch engagement at vehicle launch, to maintain said certain speed for said engine output shaft irrespective of how said throttle control is operated by the driver via said accelerator pedal until said transmission input shaft has been accelerated to a predetermined speed programmed into the microprocessor and indicating a proper launch, and to return the control of said throttle setting to the driver upon an occurrence of said proper launch.

2. The improvement set forth in claim 1 further including means effective upon aborting of a launch attempt to return control of throttle setting to said throttle control comprising means wherein aborting is indicated by disengagement of said clutch before said transmission input shaft has been accelerated to said predetermined speed that has been programmed for said transmission input shaft.

* * * * *